United States Patent [19]

Satomura

[11] Patent Number: 5,231,650
[45] Date of Patent: Jul. 27, 1993

[54] DIGITAL SIGNAL REPRODUCING APPARATUS

[75] Inventor: Seiichiro Satomura, Kawasaki, Japan

[73] Assignee: Canon Kabushiki Kaisha, Tokyo, Japan

[21] Appl. No.: 544,653

[22] Filed: Jun. 27, 1990

[30] Foreign Application Priority Data

Jun. 29, 1989 [JP] Japan .................. 1-165290

[51] Int. Cl.$^5$ .................................... H04L 27/06
[52] U.S. Cl. ................................. 375/95; 375/118
[58] Field of Search ............... 375/95, 94, 110, 117, 375/118; 307/510, 511, 527, 234; 328/108, 111; 360/41, 45

[56] References Cited

U.S. PATENT DOCUMENTS

| | | | |
|---|---|---|---|
| 4,280,224 | 7/1981 | Chethik | 375/95 |
| 4,546,394 | 10/1985 | Yamamoto | 375/95 |
| 4,611,335 | 9/1986 | Arai et al. | 375/110 |
| 4,780,888 | 10/1988 | Solhjell et al. | 375/110 X |
| 4,896,025 | 1/1990 | Hasegawa | 235/437 |
| 4,979,189 | 12/1990 | Wile | 375/95 |
| 4,982,110 | 1/1991 | Yokogawa et al. | 375/110 X |

Primary Examiner—Curtis Kuntz
Assistant Examiner—T. Ghebretinsae
Attorney, Agent, or Firm—Fitzpatrick, Cella, Harper & Scinto

[57] ABSTRACT

There is provided a digital signal reproducing apparatus comprising: a binarization circuit to binarize a signal which was read out of a recording medium or a transmitted signal; first and second pulse generators to generate pulses which are respectively synchronized with leading and trailing edges of a binary signal which was binarized by the binarization circuit; and first and second signal generators to generate first and second position signals indicative of the positions of the leading and trailing edges synchronously with the first and second sync pulses which are generated from the first and second pulse generators. The binary signal is a signal of the NRZI coding method. Each pulse generator has a PLL circuit. With the apparatus, the signal can be accurately reproduced irrespective of the recording density by compensating the phase difference between the leading and trailing edges of the binary signal.

7 Claims, 5 Drawing Sheets

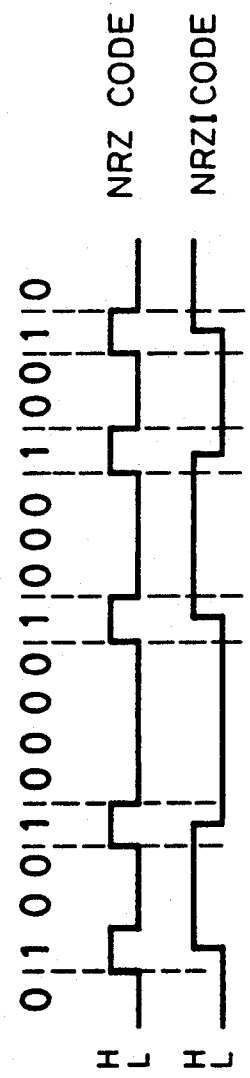
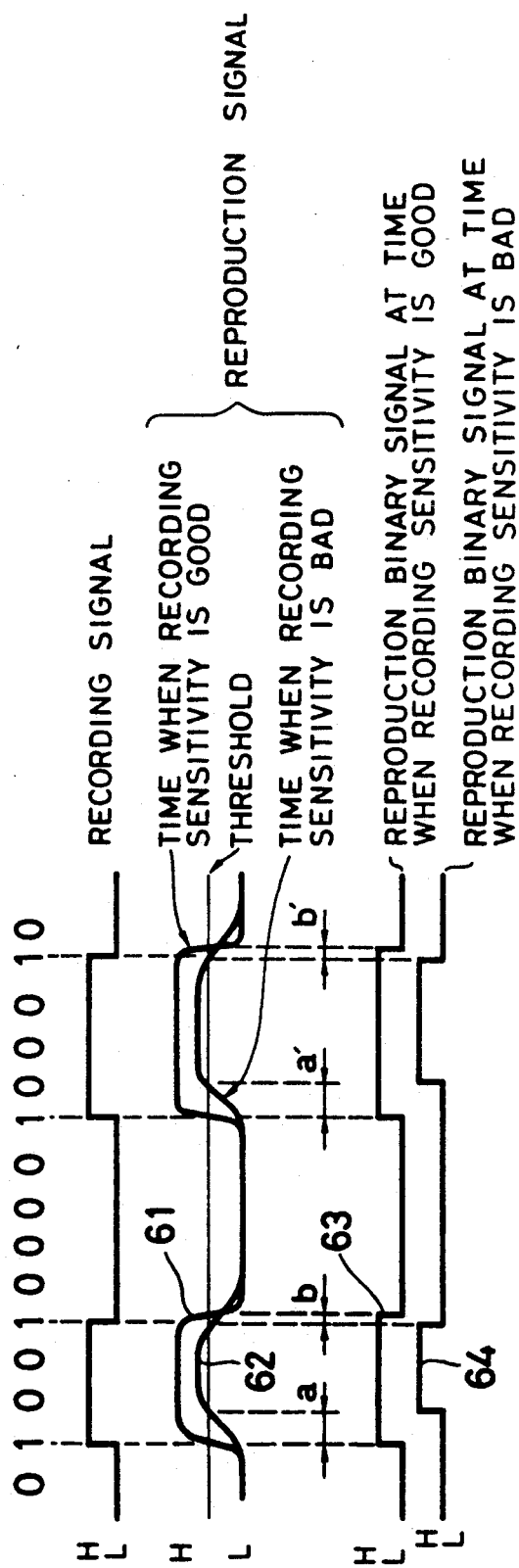

DIGITAL SIGNAL REPRODUCING APPARATUS

BACKGROUND OF THE INVENTION

Field of the Invention

The present invention relates to a digital signal reproducing apparatus for accurately reproducing a transmitted binary signal or a binary signal which was read out of a recording medium.

Related Background Art

FIG. 4 is a block diagram showing a conventional information decoding and reproducing apparatus for decoding a transmitted binary signal or a binary signal which was reproduced from a recording medium.

In FIG. 4, an explanation will now be made with respect to the case of reading out data which was recorded in a recording medium such as magnetic disk 1, magnetic tape 2, or the like. The data written in the recording medium is first converted into an electric signal corresponding to the magnetic flux density detected by a detector 3 comprising a magnetic head or the like. The electric signal is amplified by a preamplifier 4 and binarized by a binarization circuit 5. The binary signal which was binarized by the binarization circuit 5 is input to a PLL circuit 6. A sync clock signal which is synchronized with the binary signal is produced from the PLL circuit 6. The binary signal is a signal which has been encoded by, for instance, a 2-7 conversion coding method or the like. The sync clock signal and the binary signal are input to a code decoding circuit 7. The decoded reproduction data and a clock synchronized therewith are output from the code decoding circuit 7.

Even in the case of using an optical disk in place of the magnetic disk and magnetic tape, only the detecting method by the detector 3 differs and the subsequent processes are similar to those mentioned above.

As a method of writing data into the recording media 1 and 2, there are mainly used an NRZ coding (mark interval storing system) method whereby in the binarized signal, a truth value (code word) "1" is made to correspond to one pulse and an NRZI coding (mark length storing system) method whereby a truth value (code word) "1" is made correspond as a change point of the polarity of the signal as shown in FIG. 5.

Either one of the above two methods is selected used in accordance with the characteristics of the recording medium, characteristics of the transmitting method, characteristics of the coding system, and the like.

The NRZI code and NRZ code in FIG. 5 will now be compared. In the case of the NRZI code, since information is provided for the edges of both polarities of the leading and trailing edges of the signal, when comparing in the same frequency band, information can be transmitted or stored at a double density.

However, to use the NRZI code, some conditions are required for the transmitting system. That is, to use the NRZI code, in the transmitting system of the signal, the ratio of the "H" level signal on the transmission side and the ratio of the "H" level signal on the reception side must coincide, while the ratio of the "L" level signal on the transmission side and the ratio of the "L" level signal on the reception side must coincide, respectively.

However, for instance, in the case of recording information by forming optical, magnetical, or physical pits onto one recording medium, there is a case where the ratios of "H" and the ratios of "L" mentioned above in the recording information and the reproduced information do not coincide.

For instance, if a difference occurs between the recording sensitivity and the reproducing sensitivity due to the characteristics of the recording means of the recording and reproducing apparatus and the characteristics of the reading means thereof, as shown in FIG. 6, the portion of "H" becomes long or the portion of "L" becomes long.

In FIG. 6, reference numeral 61 denotes a reproduction signal when the recording sensitivity is good and 62 indicates a reproduction signal when the recording sensitivity is bad.

If the recording sensitivity and the reading sensitivity are good, the reproduction signal has a waveform near the recording signal as shown by reference numeral 63 and the relation between the time when the reproduction binary signal is held in the state of "H" and the time when it is held in the state of "L" is held as it is in a manner similar to that in the recording signal.

Therefore, in such a case, the NRZI coding method can be used.

However, when the recording sensitivity is low, the reproduction signal waveform becomes dull as shown by reference numeral 62 and the phases of the leading edge and trailing edge of the reproduction binary signal are deviated as shown by reference numeral 64.

Further, when the recording sensitivity is not constant, a phase deviation amount also becomes unstable and the efficient NRZI coding method cannot be used.

SUMMARY OF THE INVENTION

It is an object of the invention to provide a digital signal reproducing apparatus in which the foregoing drawbacks are eliminated.

Another object of the invention is to provide a digital signal reproducing apparatus for accurately reproducing a signal without being influenced by a recording sensitivity.

Still another object of the invention is to provide a digital signal reproducing apparatus for reproducing an accurate signal by compensating a phase deviation between the leading edge and the trailing edge of a binary signal.

Further another object of the invention is to provide a digital signal reproducing apparatus which can use the NRZI coding method.

The above and other objects and features of the present invention will become apparent from the following detailed description and the appended claims with reference to the accompanying drawings.

BRIEF DESCRIPTION OF THE DRAWINGS

FIG. 5 is a timing chart for explaining a general recording method; and

FIG. 6 is a timing chart for explaining the problems in the case of using the conventional NRZI coding method.

DETAILED DESCRIPTION OF THE PREFERRED EMBODIMENTS

An embodiment according to the invention will be described in detail hereinbelow with reference to the drawings.

The invention is applied to the reproduction of a communicated signal and the reproduction of the signal which was read out of a recording medium. Explanation will now be made with respect to a method of decoding a signal obtained by reproducing and reading out NRZI coding method information which had been encoded in accordance with the NRZI coding method and stored into a memory medium.

Figure 1:
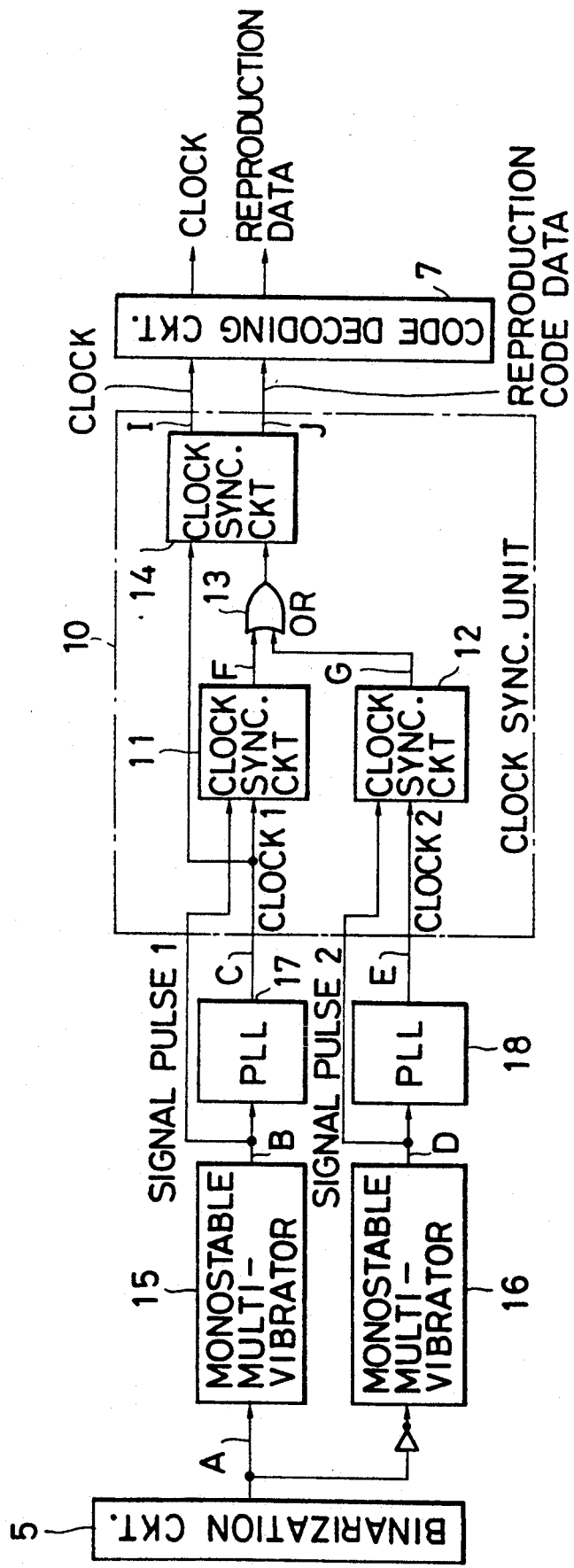
FIG. 1 is a block diagram showing an embodiment according to the present invention.
Figure 4:
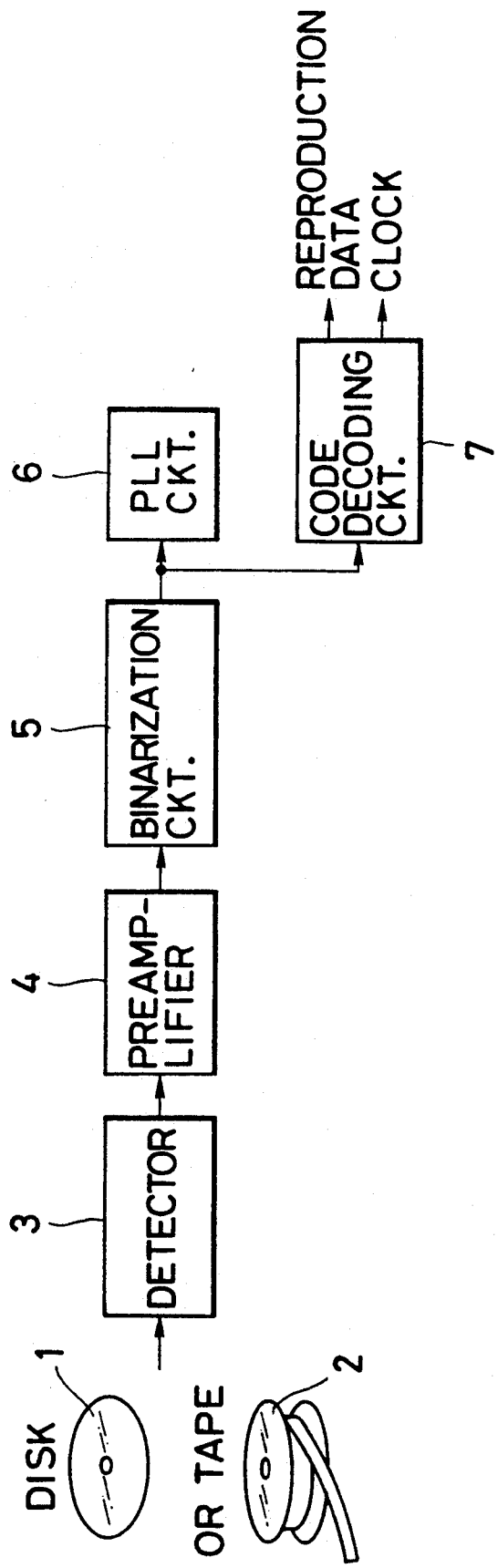
FIG. 4 is a block diagram for explaining a general digital information reproducing apparatus.

FIG. 1 is a block diagram of an embodiment according to the invention and is a diagram showing the details of a circuit corresponding to the PLL circuit 6 in FIG. 4. The parts and components similar to those in FIG. 4 are designated by the same reference numerals and their detailed descriptions are omitted here.

Figure 2:
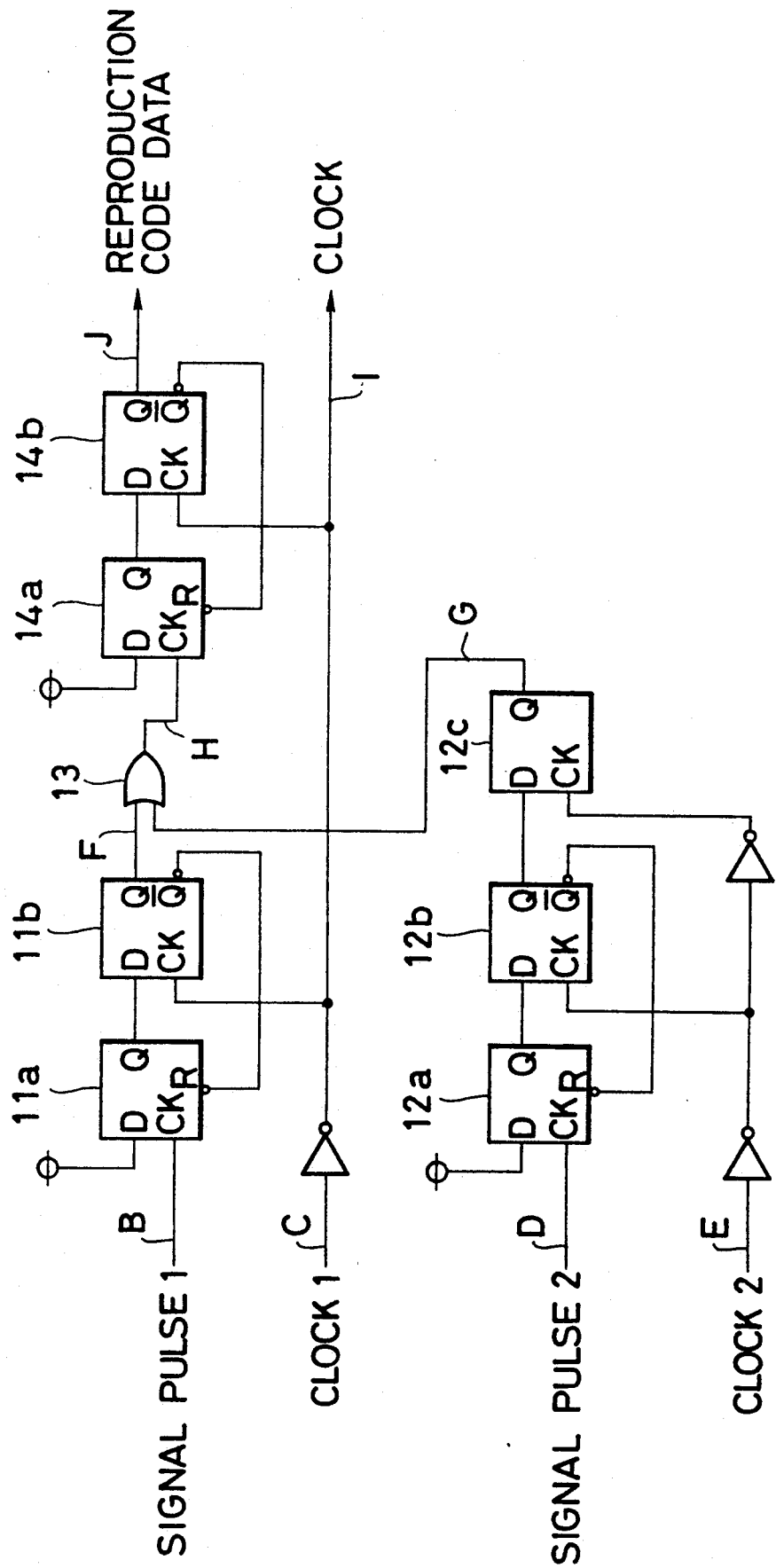
FIG. 2 is a detailed circuit diagram of a clock sync unit 10 in FIG. 1.

FIG. 2 is a detailed circuit diagram of a clock sync unit 10 in FIG. 1.

Figure 3:
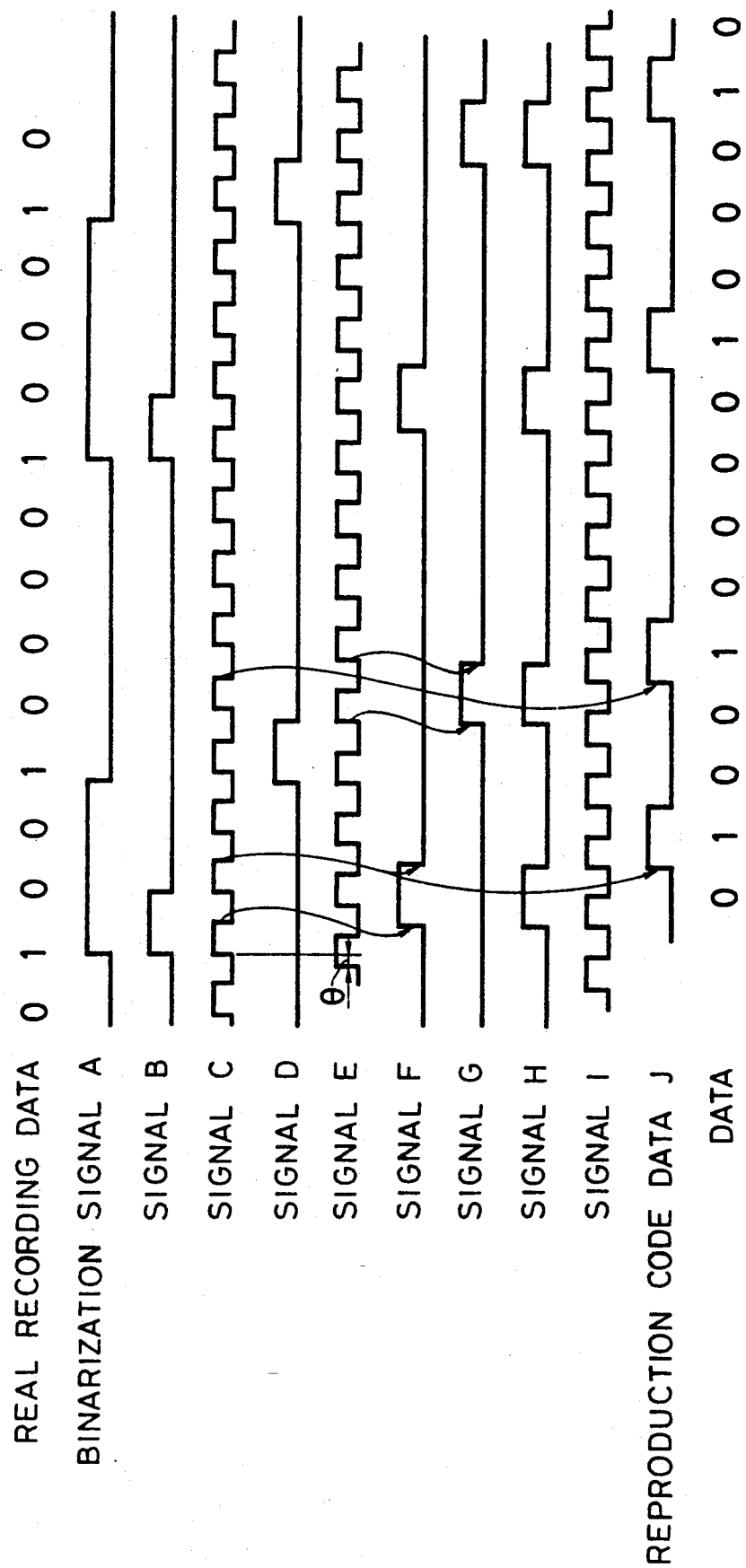
FIG. 3 is a timing chart of input/output signals in the embodiment shown in FIGS. 1 and 2.

FIG. 3 is a timing chart for signals in FIGS. 1 and 2.

In the embodiment, attention is paid to a point that phase delays a and a' of the leading edges in FIG. 6 are equal and, further, phase delays or phase advances b and b' of the trailing edges are equal.

That is, when paying attention to only the leading edges or trailing edges, their phases are delayed by only the same phase error amount irrespective of the degree of the recording sensitivity. Therefore, the apparatus is constructed by also comprising: means for producing a clock synchronized with the phase of the leading edge of a binary signal; means for generating information corresponding to the position of the leading edge by using the clock as a reference; means for producing a clock synchronized with the phase of the trailing edge; and means for generating information corresponding to the position of the trailing edge by using the clock as a reference.

Due to this, the phase difference between the leading edges of the binary signal and the phase difference between the trailing edges are set off and the edge position information can be accurately reproduced. Therefore, the NRZI code can be used irrespective of a change in sensitivity or the like.

In FIGS. 1 and 2, a binary signal "A" from the binarization circuit 5 is a signal which was encoded by the NRZI coding method and has information with respect to both of the positions of the leading and trailing edges. However, as mentioned above, according to the above system, in many cases, there is a phase deviation between the leading edge and the trailing edge due to the instability of the recording sensitivity and the signal is read out in such a phase deviated state. When explaining with respect to an example shown in the timing chart of FIG. 3, the phase of the trailing edge has been advanced than the phase of the leading edge by only about "$\theta$".

Therefore, to also properly cope with such a phase deviation, in the embodiment, pulse signals "B" and "D" having predetermined widths which are synchronized with the leading edge and the trailing edge are first produced by two monostable multivibrators 15 and 16, respectively. The pulse signals "B" and "D" are input to PLL circuits 17 and 18, respectively.

The PLL circuits 17 and 18 produce clock signals "C" and "E" having predetermined periods which are synchronized with the pulse signals "B" and "D" and send to the clock sync unit 10 together with the above signals "B" and "D". The periods of the clock signals "C" and "E" coincide with the period of the sync clock of the real recording data. In the case of FIG. 3, there is a phase deviation of only "$\theta$" between the clock signals "C" and "E" as mentioned above.

In the clock sync unit 10, the clock synchronization is executed by each clock signal by clock sync circuits 11 and 12 and data signals "F" and "G" are produced.

FIG. 2 shows a detailed diagram of the clock sync unit 10. The clock sync circuit 11 uses two flip-flops 11a and 11b. The clock sync circuit 12 uses three flip-flops 12a, 12b, and 12c. In the clock sync circuit 11, since the inverted signal of the signal C is used as a clock signal of the flip-flop 11b, the signal F rises later than the signal B by the time of half clock and is output with a pulse width of one clock period.

On the other hand, in the clock sync circuit 12, since the signal E is used as a clock signal of the flip-flop 12c, a signal G rises later than the signal D by the time of one clock and is output with a pulse width of one clock period.

After that, the OR of both data signals "F" and "G" is calculated by an OR circuit 13. In a clock sync circuit 14 (using two flip-flops 14a and 14b as shown in FIG. 3), a data "J" and a clock signal "I" as an inverted signal of the clock signal "C" are produced by reproduction code synchronously with the OR signal "H" and one clock (leading clock signal "C" in this case). In the clock sync circuit 12, the leading edge of the signal D is delayed by the time of one period of the clock signal E and is synchronized. In the clock sync circuit 14, the signal G is delayed by the time of half period of the clock signal C and is synchronized. Therefore, if the phase difference of the trailing edge of the binary signal A is equal to or smaller than the half period of the clock signal C, the phase difference can be absorbed.

Therefore, as shown in FIG. 3, the reproduction code word data "J" is output as reproduction data which is equal to the real recording data shown in the top portion in FIG. 3 together with the clock signal "I" as a sync signal because the phase difference between the leading and trailing edges which is caused due to the instability of the sensitivity is eliminated and corrected. The reproduction code word data is decoded to the original data by the code decoding circuit 7.

As described above, according to the embodiment, in the case of using the NRZI coding method, even in the case where a phase deviation is caused between the leading information of the read signal and the trailing information thereof due to a deterioration of the reading sensitivity or the like, such a phase deviation can be effectively corrected and the stable reproduction code word data can be obtained.

As mentioned above, it is possible to compensate the phase shift error of the trailing edge for the leading edge of the binary signal which is caused by a level change of the reception analog signal by a sensitivity change.

Therefore, in the recording or signal transmission in which only the mark interval recording method (NRZ code) can be used hitherto, the mark length recording method (NRZI code) can be used. Thus, the recording density can be doubled.

Since the PLL circuits 17 and 18 operate by receiving pulses of predetermined widths, they need the monostable multivibrators 15 and 16 shown in FIG. 1 and described above. However, if the phase comparator arranged in the inputting section of the PLL circuits 17 and 18 is of the type so as to operate by, for instance, edge inputs, the monostable multivibrators 15 and 16 can be omitted.

In the embodiment, the trailing edge data has been clock synchronized with the leading edge data and handled as a series of serial data. However, the invention is not limited to the above example. The invention also obviously incorporates a construction in which the leading edge data and the trailing edge data are respectively independently reproduced and output as independent reproduction data and used.

As described above, according to the embodiment, it is possible to compensate the phase shift error of the trailing edge for the leading edge of the binary signal which is caused by a level change of the reception analog signal due to the sensitivity change. Thus, in the recording or signal transmission in which only the mark interval recording method (NRZ code) can be used hitherto, the mark length recording method (NRZI code) can be used and the recording density can be doubled.

The present invention is not limited to the foregoing embodiment but many modifications and variations are possible within the spirit and scope of the appended claims of the invention.

I claim:

1. A digital signal reproducing apparatus comprising:
   a binarization circuit to binarize a signal which was read out of a recording medium or a signal which was transmitted;
   a first pulse generator to generate a first pulse which is synchronized with a leading edge of a binary signal which was binarized by the binarization circuit;
   a second pulse generator to generate a second pulse which is synchronized with a trailing edge of said binary signal;
   a first clock generator to generate a first clock which is synchronized with the first pulse generated by said first pulse generator;
   a second clock generator to generate a second clock which is synchronized with the second pulse generated by said second pulse generator;
   a third pulse generator to generate a third pulse in response to said first pulse and said first clock;
   a fourth pulse generator to generate a fourth pulse in response to said second pulse and said second clock;
   a fifth pulse generator to synchronize both said third pulse generated by said third pulse generator and said fourth pulse generated by said fourth pulse generator with one of said first clock and said second clock, and to generate a synthetic pulse of the synchronized third and fourth pulses; and
   decoding means to decode the synthetic pulse generated by said fifth pulse generator as a reproduction signal.

2. An apparatus according to claim 1, wherein the binary signal is a signal of an NRZI coding method.

3. An apparatus according to claim 1, wherein each of the first and second pulse generators has a PLL circuit.

4. An apparatus according to claim 1, wherein said fifth pulse generator generates a new reproduction signal by synchronizing a logical sum of said third and fourth pulses with one of said first clock and said second clock.

5. A digital signal reproducing apparatus comprising:
   a binarization circuit to binarize an analog signal which is expressed by an NRZI method;
   a first pulse generator to generate a first pulse which is synchronized with a leading edge of a binary signal which was binarized by the binarization circuit;
   a second pulse generator to generate a second pulse which is synchronized with a trailing edge of said binary signal;
   a first clock generator to generate a first clock which is synchronized with the first pulse generated by said first pulse generator;
   a second clock generator to generate a second clock which is synchronized with the second pulse generated by said second pulse generator;
   a third pulse generator to generate a third pulse in response to said first pulse and said first clock;
   a fourth pulse generator to generate a fourth pulse in response to said second pulse and said second clock;
   a fifth pulse generator to generate a signal of an NRZ method by synchronizing the third and fourth pulses with one of said first clock and said second clock.

6. An apparatus according to claim 5, wherein said first clock generator and said second clock generator each include a PLL circuit.

7. An apparatus according to claim 5, wherein said fifth generator generates a new reproduction signal by synchronizing a logical sum of said third and fourth pulses with one of said first clock and said second clock.

* * * * *

UNITED STATES PATENT AND TRADEMARK OFFICE
CERTIFICATE OF CORRECTION

PATENT NO. : 5,231,650  Page 1 of 2
DATED : July 27, 1993
INVENTOR(S) : SEIICHIRO SATOMURA It is certified that error appears in the above-identified patent and that said Letters Patent is hereby corrected as shown below:

On title page, item

[56] REFERENCES CITED

U.S. Patent Documents, insert
--4,688,205  8/1987  Abiko ............... 360/51X
  4,188,620  2/1980  Lamare et al. ....... 360/42X
  4,860,324  8/1989  Satomura ............ 375/122
  4,482,927 11/1984  Melbye et al. ....... 360/40X--.

Insert,--Foreign Patent Documents
  3602508  7/1986  Germany
  2170679  8/1986  United Kingdom--.

Item [57] Abstract, line 12,

"pulse," should read --pulse--.

COLUMN 1

Line 45, "made" should read --made to--.

UNITED STATES PATENT AND TRADEMARK OFFICE
CERTIFICATE OF CORRECTION

PATENT NO. : 5,231,650
DATED : July 27, 1993
INVENTOR(S) : SEIICHIRO SATOMURA

It is certified that error appears in the above-identified patent and that said Letters Patent is hereby corrected as shown below:

<u>COLUMN 2</u>

Line 46, "Further" should read --Further,--.

Signed and Sealed this

Twelfth Day of April, 1994

Attest:

BRUCE LEHMAN

Attesting Officer

Commissioner of Patents and Trademarks